Dec. 5, 1967 M. O. HALFHILL ET AL 3,356,934

DOUBLE FREQUENCY RECORDING SYSTEM

Filed Nov. 20, 1964

INVENTORS.
MARTIN O. HALFHILL
HAROLD C. STEPHENS
BY
Robert B. Crouch
ATTORNEY

United States Patent Office 3,356,934
Patented Dec. 5, 1967

3,356,934
DOUBLE FREQUENCY RECORDING SYSTEM

Martin O. Halfhill and Harold C. Stephens, San Jose, Calif., assignors to International Business Machines Corporation, New York, N.Y., a corporation of New York Filed Nov. 20, 1964, Ser. No. 412,776
7 Claims. (Cl. 328—63)

Figure 1:
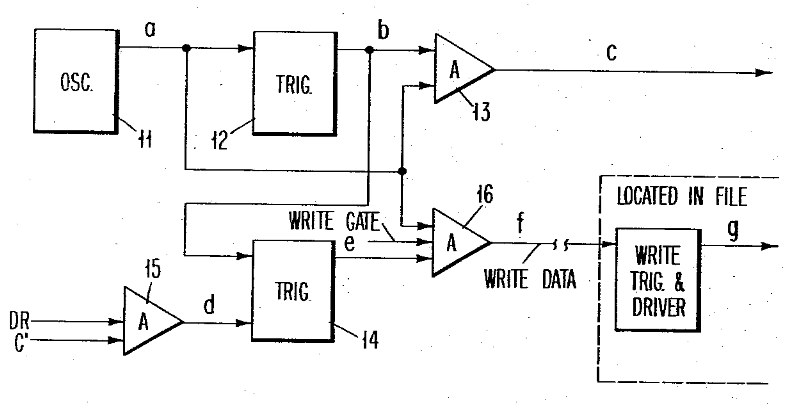

The present invention relates to magnetic recording and more particularly to a binary recording system for recording data with a double frequency technique.

In saturation-type magnetic recording, binary data is usually recorded by effecting a flux reversal, i.e., a step-like change in magnetization from one remanent state of saturation of the recording medium to the opposite state. These flux reversals or "bits," are recorded in a timed sequence with a series of regularly occurring clock or timing signals. These clock signals, which control the rate of which information is recorded on or read from the recording medium, also define the clock interval, i.e., the time period between adjacent clock signals. This clock interval can be expressed either as a space on the recording medium or as a period of time. The double frequency method of recording is a saturation-type recording technique which differs from most such techniques in that it is self-clocking, i.e., there is at least one flux reversal or bit recorded per clock interval. The double frequency recording technique can be explained as one in which a clock signal occurs during every clock interval and an additional data signal is either present or absent, depending upon the binary value of the information recorded during that clock interval. This technique can also be explained as one in which data of a first binary value is indicated by a single flux reversal during a clock interval while data of the second binary value is indicated by two flux reversals within a clock interval. To facilitate the readout process, it is desirable to achieve the maximum separation between flux reversals. The reversals are therefore spaced apart an amount equal to one-half the clock interval. This, in practice, results in a flux reversal (clock) at the beginning of every clock interval and a second flux reversal (data) at the midpoint of each clock interval having a second binary value.

Heretofore, the double frequency recording technique has been carried out by processes which involve synchronization of two separate pulse trains and then addition of one to the other to produce a combined pulse train. In a typical process, a first pulse train (clock) is generated, so that the pulses occur at the clock frequency and in coincidence with the beginning of each clock interval. This clock pulse train is then delayed an amount equal to one-half the clock period and utilized to gate data signals of the second binary value out of a register. The gated data pulses and the clock pulse train are then mixed in an AD gate to produce a combined pulse train in which a pulse occurs at the beginning of each clock interval and an additional pulse occurs at the midpoint of each clock interval having a second binary value.

Inherent in the known techniques of double frequency recording is the problem of bit shift, i.e., the data signals or bits are not added at the precise midpoint of the clock intervals but are shifted from the midpoint toward either the beginning or the end of the clock interval. The existence of bit shift creates a major problem in readout, since the greater the bit shift the more difficult it becomes to distinguish the data signals from the clock signals. With the known techniques of double frequency recording, delay mechanisms, such as delay lines, single shots, etc., have been used to delay the clock pulse train so as to gate the data signals into the desired clock interval. However, even the most precise of these circuit components have a range of tolerances which have created major problems in bit shift. This problem of bit shift has become intolerable in the environment of present day magnetic storage files which employ removable storage media, such as disks, tape strips, tape loops, etc. While it may be practical to adjust the read circuits of a given file to accommodate the inaccuracies inherent in the write circuitry within that file, the task of adjusting the read circuit of one file to accommodate the variety of inaccuracies inherent in the write circuits of all the different files which may process a given memory unit becomes overwhelming.

The object of the present invention is to provide means of recording binary information with a double frequency technique without measurable bit shift.

The above object is carried out without the disadvantages of the prior art systems by provision of a recording system in which all the pulses, clock and data, are produced directly from a common source. In the present system, a crystal oscillator produces a first pulse train in which a pulse occurs at the beginning and at the midpoint of every clock interval. This pulse train is divided to produce a second pulse train having a pulse at the beginning of each clock interval. The second pulse train is used to strobe data signals of a first binary value from a register and to produce a gating signal. The gating signal is then applied to the first pulse train to gate out the pulses occurring at the midpoint of each clock interval having a first binary value and to pass all other pulses. This results in a pulse train in which a clock pulse occurs at the beginning of every clock interval and a data pulse occurs at the midpoint of each clock interval having a second binary value and in which all pulses are produced directly from a common source without the use of delay mechanisms.

Figure 2:
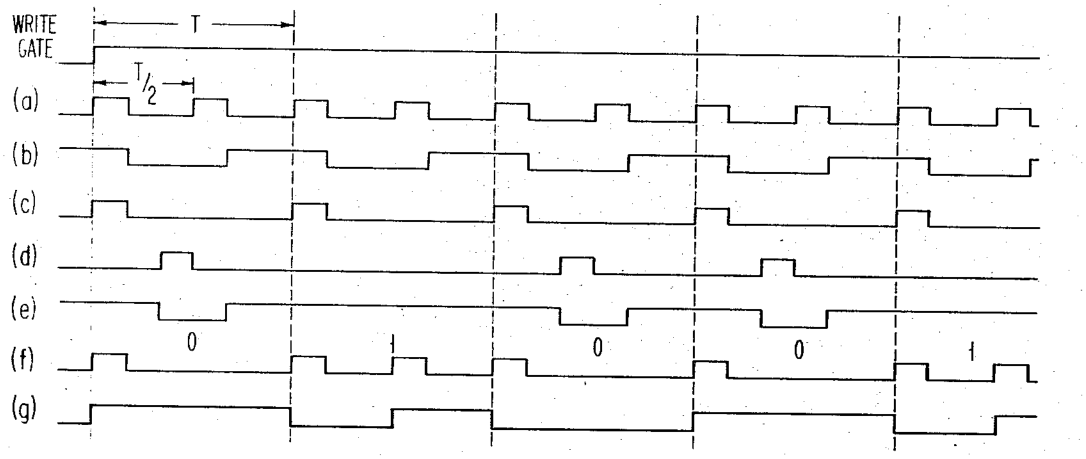

Other objects and many of the attendant advantages of this invention will be readily appreciated as the same becomes better understood by reference to the following detailed description of a preferred embodiment of the invention as illustrated in the accompanying drawings, wherein:

FIG. 1 is a schematic diagram of the logical circuitry employed in the present invention; and FIG. 2 shows a series of waveforms illustrating the relationship of signals in the different portions of the circuit of FIG. 1.

The circuitry of the present recording system as illustrated in FIG. 1 includes a crystal oscillator 11 connected in series with a D.C. binary trigger 12. A logical AND gate 13 is connected to the outputs of both the trigger 12 and the oscillator 11. An A.C. binary trigger 14 is connected to the outputs of D.C. trigger 12 and a logical AND gate 15. A logical AND gate 16 is connected to the outputs of A.C. trigger 14 and oscillator 11. A write trigger may be connected to the output of AND gate 16.

Referring to FIG. 2, the clock interval is indicated at T, i.e., the time period between the vertical dashed lines. The output of oscillator 11 is represented by waveform *a* in which the pulses occur at an interval of T/2, i.e., a pulse at the beginning and at the midpoint of every clock interval. Waveform *a* is applied to D.C. binary trigger 12 whose output, waveform *b*, is high at the beginning of every clock interval. As indicated by waveform *b*, trigger 12 is flipped by the trailing edge of each of the pulses of waveform *a*. When waveforms *a* and *b* are applied to logical AND gate 13, only the pulses of waveform *a* which occur at the beginning of the clock intervals are passed, as shown in waveform *c*. In waveform *c*, a single pulse occurs at the leading edge of each clock interval. Waveform *c* is used as the full period clock signal for various transactions in the file and the file control unit.

Waveform *c* is delayed by any suitable means, such as logic delays or an inexpensive single shot, to approximately one-third of the clock interval to produce a regularly occurring signal *c'* (not shown). Signal *c'* is used to strobe data signals of a first binary value from a data register and through logical AND gate 15. The output of AND gate 15 is waveform *d* in which a pulse occurs at approximately the one-third point of each clock interval having a first (zero) binary value. The precise location of the pulses of waveform *d* is unimportant as long as they occur between the first and second pulses of waveform *a* in each clock interval. Waveform *d* and waveform *b* are applied to A.C. binary trigger 14 to produce waveform *e*. The output of trigger 14 is normally high, but is driven down by any pulse in waveform *d* occurring when the signal level of waveform *b* has dropped. As shown in waveform *e*, the output of trigger 14 remains down until the voltage level of waveform *b* is raised. This raises the level of waveform *e* and it remains high until driven down again by the next combination of pulses of waveforms *d* and *b*. Waveform *e* is applied to logical AND gate 16 along with waveform *a* to produce waveform *f*. When the write gate signal level is raised, waveform *a* is gated through AND gate 16 by waveform *e*. As shown in waveform *f*, the pulses of waveform *a* which occur when the signal level of waveform *e* is down are gated out, so that waveform *f* contains a clock pulse at the beginning of each clock interval plus a data pulse at the midpoint of each clock interval having a second (one) binary value. Waveform *f* corresponds to waveform *a* except for the omission of the pulse at the midpoint of each clock interval in which a pulse occurs in waveform *d*. Waveform *f* may then be applied to the write triggers and drivers to produce a recording waveform *g* in which a flux reversal occurs at the beginning of each clock interval and an additional flux reversal occurs at the midpoint of each clock interval having a secondary binary value.

An important feature of the present system lies in its ability to gate out all of the undesired data pulses without any niceties of timing. With the present system there is no possibility of a portion of the undesired data pulse being gated through AND gate 16, since the signal level of waveform *e* is dropped before the occurrence of the undesired data pulse in waveform *a* and is raised only by the trailing edge of the undesired data pulse. Thus, regardless of the widths of the pulses of waveforms *a* through *d*, the signal level of waveform *e* will not be raised until the entire undesired pulse of waveform *a* goes away. A further feature is that the accuracy of the present system is simply a function of the accuracy of the oscillator used, since all of the pulses of waveform *f* are generated directly by the oscillator. Thus, the data pulses occur precisely at the midpoints of the desired clock intervals in waveform *f*. While any type oscillator can be used, depending upon the accuracy required in a given system, a crystal oscillator is preferred since they are inexpensive and extremely accurate, that is, no drift up to .01 percent.

The invention has been particularly shown and described with reference to a preferred embodiment, however, modifications and variation of the invention are possible in light of the above teachings. It is, therefore, understood that within the scope of the appended claims, the invention may be practiced otherwise than as specifically described.

What we claim is:

1. A binary recording system for producing a recording waveform having a flux reversal at the beginning of every clock interval and an additional flux reversal at the midpoint of each clock interval having a second binary value, including

- means for generating a pulse train in which a pulse occurs at the beginning and at the midpoint of every clock interval, and
- means responsive to data of a first binary value for blocking pulses from the pulse train which occur at the midpoint of clock intervals having the first binary value.

2. A binary recording system for producing a recording waveform having a flux reversal at the beginning of every clock interval and an additional flux reversal at the midpoint of each clock interval having a second binary value, including

- means for generating a first pulse train in which a pulse occurs at the beginning and at the midpoint of every clock interval,
- means for developing a second pulse train in which a pulse occurs at the beginning of every clock interval, and
- means responsive to the second pulse train and to data of a first binary value for blocking pulses from the first pulse train which occur at the midpoint of clock intervals having the first binary value.

3. A binary recording system for producing a recording waveform having a flux reversal at the beginning of every clock interval and an additional flux reversal at the midpoint of each clock interval having a second binary value, including

- means for generating a first pulse train in which a pulse occurs at the beginning and at the midpoint of every clock interval,
- means for generating a second pulse train in which a pulse occurs at the beginning of every clock interval,
- means responsive to the second pulse train and to data of a first binary value for developing a gating signal, and
- means for applying said gating signal to the first pulse train to gate out pulses from the pulse train which occur at the midpoints of clock intervals having the first binary value.

4. A binary recording system for producing a recording waveform having a flux reversal at the beginning of every clock interval and an additional flux reversal at the midpoint of each clock interval having a second binary value, including

- means for generating a first pulse train in which a pulse occurs at the beginning and at the midpoint of every clock interval,
- means for developing a second pulse train having a pulse at the beginning of every clock interval,
- means responsive to the second pulse train for gating data of a first binary value from a register,
- means responsive to the gated data for developing a gating signal, and
- means for applying the gating signal to the first pulse train to gate out pulses which occur at the midpoint of clock intervals having the first binary value.

5. A binary recording system as defined in claim 4 wherein

- the gating signal includes a blocking segment the length of which is controlled by the gated data and the pulses to be gated out of the first pulse train.

6. A binary recording system for producing a recording waveform having a flux reversal at the beginning of every clock interval and an additional flux reversal at the midpoint of each clock interval having a second binary value, including

- a crystal oscillator for generating a first pulse train having a pulse at the beginning and midpoint of every clock interval,
- first means connected to the oscillator for dividing the first pulse train to provide a second pulse train having a pulse at the beginning of each clock interval, second means responsive to the second pulse train for clocking data of a first binary value out of a register.

third means connected to the first means and to the second means for developing a gating signal, and means for applying the gating signal to the first pulse train to gate out pulses occurring at the midpoint of clock intervals having the first binary value.

7. A binary recording system as defined in claim 6 wherein the first means includes a D.C. trigger connected to the oscillator, and an AND gate connected to the trigger and the oscillator, and the third means includes an A.C. trigger connected to the D.C. trigger and to the second means.

No references cited.

JOHN S. HEYMAN, *Primary Examiner.*

Disclaimer 3,356,934.—*Martin O. Halfhill* and *Harold C. Stephens*, San Jose, Calif. DOUBLE FREQUENCY RECORDING SYSTEM. Patent dated Dec. 5, 1967. Disclaimer filed Jan. 11, 1973, by the assignee, *International Business Machines Corporation*.

Hereby enters this disclaimer to claim 1 of said patent.

[*Official Gazette May 1, 1973.*]